(12) United States Patent
Koivisto et al.

(10) Patent No.: US 8,917,690 B2
(45) Date of Patent: Dec. 23, 2014

(54) METHOD AND APPARATUS FOR PROVIDING ENHANCED INTERFERENCE SUPPRESSION

(71) Applicant: Broadcom Corporation, Irvine, CA (US)

(72) Inventors: Tommi Koivisto, Espoo (FI); Timo Roman, Espoo (FI); Mihai Enescu, Espoo (FI); Tero Kuosmanen, Tampere (FI); Shuang Tan, Beijing (CN); Erlin Zeng, Beijing (CN)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/754,326

(22) Filed: Jan. 30, 2013

(65) Prior Publication Data

US 2013/0195051 A1    Aug. 1, 2013

(30) Foreign Application Priority Data

Jan. 30, 2012   (WO) ................ PCT/CN2012/070778

(51) Int. Cl.
*H04W 4/00*   (2009.01)
*G01R 31/08*   (2006.01)

(52) U.S. Cl.
USPC .......................................... 370/329; 370/252

(58) Field of Classification Search
USPC ......................................................... 370/329
See application file for complete search history.

(56) References Cited

U.S. PATENT DOCUMENTS

| 8,432,879 | B2 * | 4/2013 | Bui .............................. 370/338 |
| 2009/0175159 | A1 * | 7/2009 | Bertrand et al. .............. 370/203 |
| 2011/0310825 | A1 * | 12/2011 | Hu et al. ...................... 370/329 |
| 2012/0020323 | A1 | 1/2012 | Noh et al. |
| 2012/0039220 | A1 * | 2/2012 | Chen et al. .................... 370/279 |
| 2012/0176884 | A1 * | 7/2012 | Zhang et al. ................. 370/203 |
| 2012/0218950 | A1 | 8/2012 | Yu et al. |
| 2012/0243500 | A1 * | 9/2012 | Chandrasekhar et al. .... 370/330 |
| 2013/0058285 | A1 * | 3/2013 | Koivisto et al. .............. 370/329 |

FOREIGN PATENT DOCUMENTS

| CN | 101621492 A | 1/2010 |
| CN | 101989970 A | 3/2011 |
| CN | 102122985 A | 7/2011 |
| EP | 2346201 A2 | 7/2011 |

OTHER PUBLICATIONS

International Search Report and Written Opinion for Corresponding PCT Application No. PCT/CN2012/070778, dated Nov. 1, 2012 (9 pages).
International Application No. PCT/CN2012/070778, filed Jan. 30, 2012.

* cited by examiner

*Primary Examiner* — Gerald Smarth
(74) *Attorney, Agent, or Firm* — Stanton IP Law (57) ABSTRACT

A method is provided that includes allocating a first subset of resource elements (REs) of a physical resource block (PRB) to a mobile terminal and associating one or more first demodulation reference symbols (DM-RS) ports therewith. The first subset of REs and the one or more first DM-RS ports have common interference characteristics, thereby providing for enhanced interference suppression. The method also includes causing transmission of the PRB for reception by the mobile terminal. Corresponding apparatus and computer program products are also provided.

15 Claims, 7 Drawing Sheets

▨ E-PDCCH
▦ PDSCH
☐ Release 8 PDCCH

| | |
|---|---|
| ▨ | CCE #1 |
| ▨ | CCE #2 |
| ■ | CRS |
| ▦ | UE-specific DM-RS, ports 7 and 8 |
| ▦ | UE-specific DM-RS, ports 9 and 10 |

FIG. 8

METHOD AND APPARATUS FOR PROVIDING ENHANCED INTERFERENCE SUPPRESSION

TECHNOLOGICAL FIELD

An example embodiment of the present invention relates generally to communications technology and, more particularly, to methods, apparatus and computer program products for providing enhanced interference suppression.

BACKGROUND

Both signaling conducted via the enhanced physical downlink control channel (E-PDCCH) and machine type communication (MTC) or machine-to-machine (M2M) may utilize only a small portion of the overall usable radio resource space. In particular, MTC may require simultaneous transmission of very small allocations from a large number of mobile terminals. The E-PDCCH has been developed to, for example, avoid physical downlink control channel (PDCCH) capacity limitations for systems with multi-user (MU)—multiple input multiple output (MIMO) and coordinated multiple point (CoMP) transmission/reception, and also for potentially better inter-cell interference coordination by moving the control to legacy physical downlink shared channel (PDSCH) regions.

Figure 1:
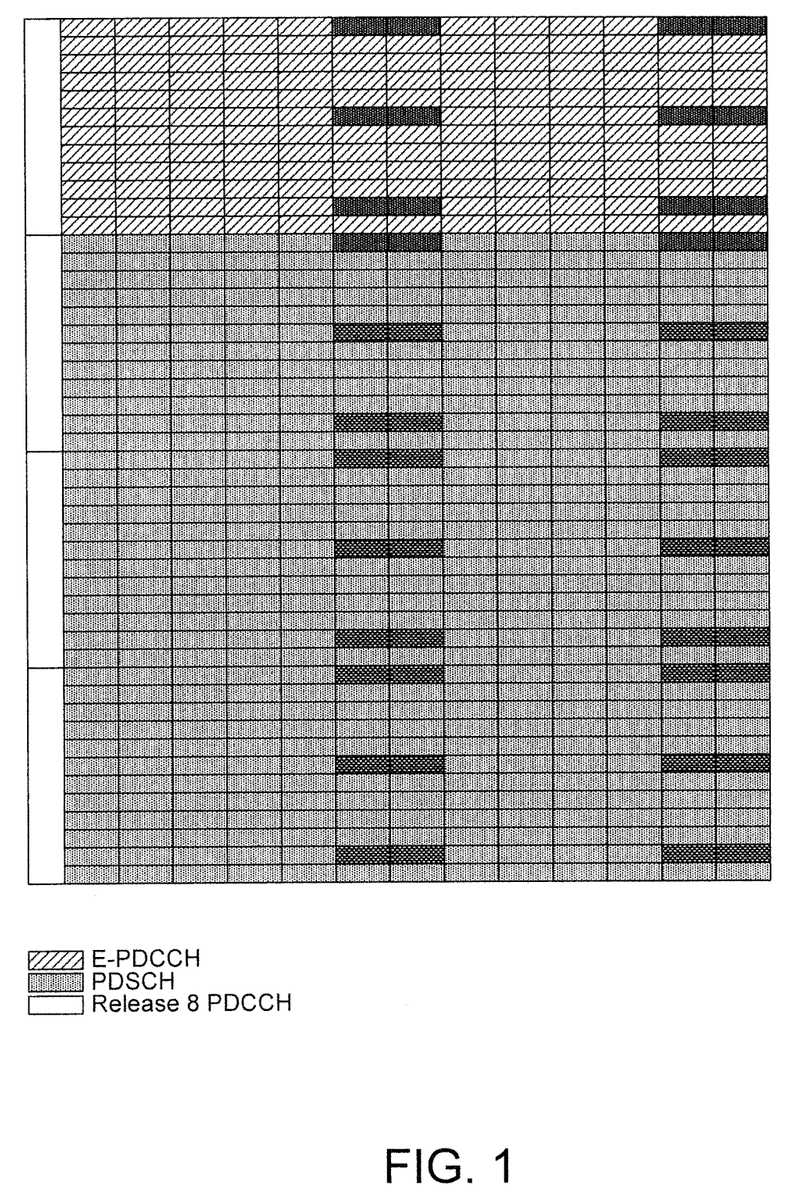
FIG. 1 illustrates an example of frequency division multiplexing (FDM) between E-PDCCH and PDSCH.

Control and other information may be transmitted via the downlink via both the E-PDCCH and PDSCH such that the control and other information transmitted via the E-PDCCH and the PDSCH may be multiplexed, such as by frequency division multiplexing (FDM). In this context, FDM means that both slots of a physical resource block (PRB) pair can be utilized for E-PDCCH, e.g., typically there is no time division multiplexing (TDM) of E-PDCCH and PDSCH in the same PRB pair. From this perspective of multiplexing, E-PDCCH will be similar to PDSCH, e.g., multiplexed to a number of PRB pairs. This principle is illustrated in FIG. 1 where an example allocation of 1 PRB for E-PDCCH is FDM-multiplexed with PDSCH. As noted by the cross-hatching in FIG. 1, the first slot of the subframe represents the Release 8/9 legacy PDCCH region, which may not be present in all cases. The PRB pairs allocated for E-PDCCH may be signaled by higher layers, e.g., Radio Resource Control (RRC), to the mobile terminal.

With FDM multiplexing, the number of resource elements (REs) available for E-PDCCH within one PRB pair may become rather high. In this context, an RE is one orthogonal frequency division multiplexing (OFDM) symbol—subcarrier pair within the OFDM transmission grid. The following table shows the number of REs available for E-PDCCH with different numbers of REs allocated for common reference symbols (CRS) and PDCCH and with either 12 or 24 REs allocated for demodulation reference symbols (DM-RS) that are used for demodulation of E-PDCCH.

| | #PDCCH | | | |
|---|---|---|---|---|
| #CRS | 0 | 1 | 2 | 3 |
| 0 | 132/120 | NA | NA | NA |
| 1 | 124/112 | 114/102 | 102/90 | 90/78 |
| 2 | 116/104 | 108/96 | 96/84 | 84/72 |
| 4 | 108/96 | 100/88 | 92/80 | 80/68 |

Since Release 8 PDCCH may use only 36 REs, the foregoing table indicates that the number of REs used for one E-PDCCH may be too large and may therefore cause resource inefficiency. Hence, multiple E-PDCCHs may be multiplexed within the PRB pair.

Similar issues may be created with PDSCH transmissions in instances in which very small packets are transmitted to multiple mobile terminals. In this regard, one PRB may be too large since 64 quadrature amplitude modulation (QAM) and MIMO with multiple parallel data streams are supported. Hence in such a case PDSCH may be resource inefficient unless multiple PDSCHs are multiplexed within one PRB pair.

Any typical multiplexing method, e.g., FDM, TDM, code division multiplexing (CDM) or space division multiplexing (SDM), may be applicable for multiplexing multiple E-PDCCHs or PDSCHs within one PRB pair. However, reference signals should be provided for demodulation of the E-PDCCH or PDSCH. In one technique, one of the existing DM-RS ports, e.g., antenna ports 7, 8, 9 or 10, may be mapped to each part of the PRB pair, hence transmitting reference signals from as many DM-RS ports as there are parts of PRB pair. Alternatively, the reference signal resource elements transmitted from one DM-RS port may be distributed among the parts of the PRB pair.

Interference aware receivers such as linear minimum mean squared error-interference rejection combining (LMMSE-IRC) receivers, typically estimate the covariance matrix of the interference at reference symbol (RS) locations by using the method of residuals. In this regard, the interference covariance matrix may be determined by averaging sample estimates at RS locations after the own cell contribution, that is, the RS symbol itself, has been subtracted, e.g., by using channel estimates and pilot sequence knowledge. However, techniques for splitting the PRB pair and a related DM-RS association may result in different parts of the PRB pair facing different interference conditions than what is experienced at the DM-RS locations that are used to estimate the corresponding interference covariance matrix, such that the interference covariance matrix may be inaccurate.

Figure 2:
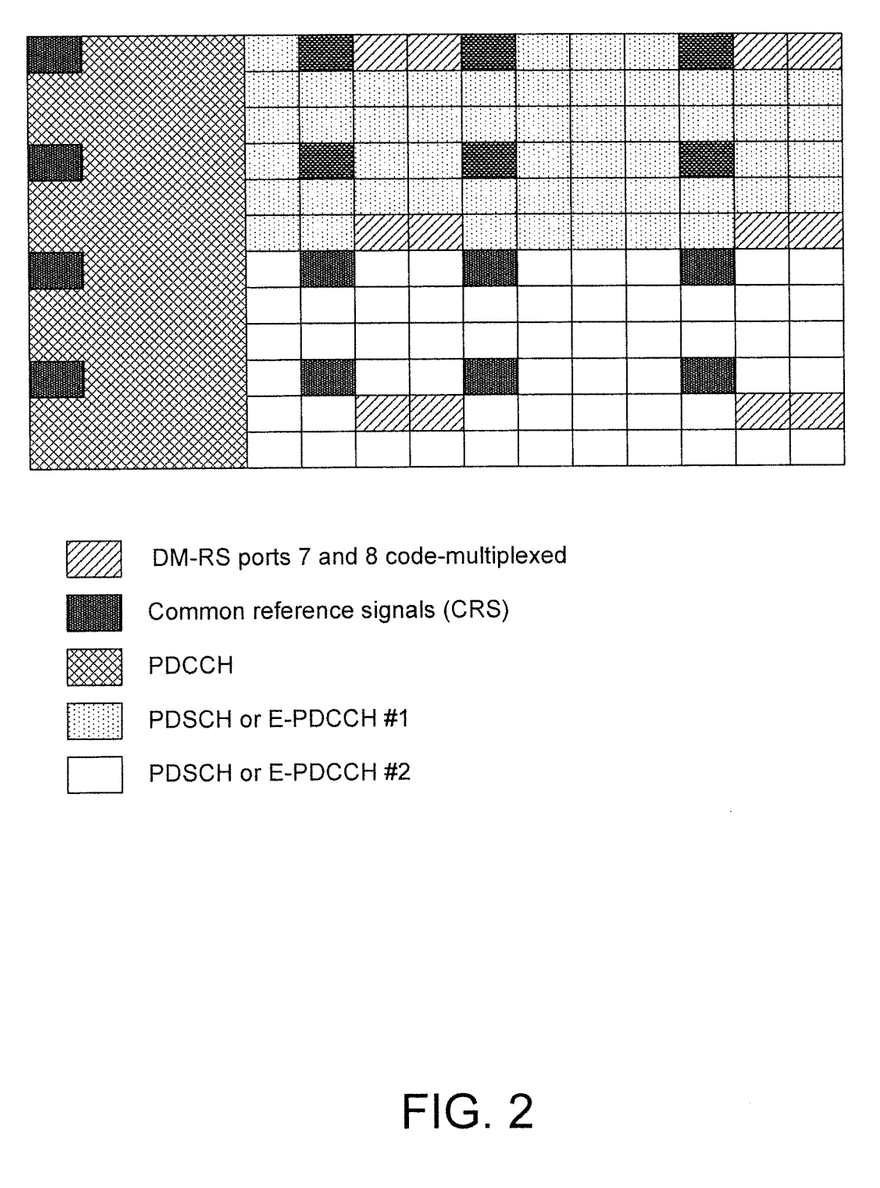
FIG. 2 illustrates an example of physical resource blocks (PRBs) that are split into two pairs with FDM.

FIG. 2 illustrates an example of the mismatch between the interference experienced by the PRB pair and the DM-RS locations. Relative to FIG. 2, two PRB pair parts that are FDM-multiplexed are shown with the first part #1 being associated with DM-RS port 7, and the second part #2 being associated with DM-RS port 8. The mobile terminal of this example may first estimate the channel and interference covariance from the corresponding DM-RS port using all 12 samples within the PRB, and then use these estimates for equalizing and suppressing interference when decoding the control information and/or data from the associated part of the PRB pair. Unfortunately, however, interference covariance estimated from DM-RS port 7 may, for example, be a sum of interference from DM-RS port 8 and outer-cell interference plus noise. Additionally, the interference covariance needed for proper equalization of control information and/or data is a sum of outer-cell interference plus noise, e.g., interference from the other DM-RS port is not present, since the PRB pair part #1 and PRB pair part #2 are FDM multiplexed and thus do no create interference to one another. As a result, the interference may be incorrectly estimated, thus impacting the performance of interference suppression and demodulation itself.

In Release 8 PDCCH, the control channels are transmitted within an aggregation of control channel elements (CCEs), where one CCE is a set of 36 REs mapped in a distributed manner over the whole system bandwidth. The control channels can be transmitted within 1, 2, 4, or 8 CCEs, called the aggregation level. The different numbers of CCEs enable link adaptation for PDCCH as a base station will be able to control the coding rate by selecting the number of CCEs for a given mobile terminal and downlink control information (DCI) format that is appropriately based on, for example, channel quality indicator (CQI) reports received from the mobile terminal. The concept of CCEs and related link adaptation mechanisms are expected to carry over to E-PDCCH such that each E-PDCCH will be transmitted within a concatenation of a certain number, e.g., 1, 2, 4 or 8, of control channel elements. However, there needs to be some flexibility in the resource mapping for E-PDCCH since E-PDCCHs will be transmitted to multiple mobile terminals in the same subframe so as to provide multiple access capability. On the other hand, the mobile terminal has no prior knowledge of the resource mapping before starting to decode E-PDCCH. At the same time, the E-PDCCH may be link-adapted so the mobile terminal also does not know the coding rate, e.g., aggregation level.

In the case of Release 8 PDCCH, search space and blind decoding are utilized to address these issues. In this regard, the mobile terminal performs several blind attempts to decode PDCCH with different assumptions about the coding rate, resource mapping and length of the DCI format. The mobile terminal determines that the PDCCH has been successfully decoded in the event that the CRC check passes, which also validates the assumptions regarding the coding rate, e.g., aggregation level, resource mapping and length of DCI format, etc. Additionally, search space is the set of different CCE starting positions, e.g., resource mapping, and different aggregation levels that the mobile terminal is to check for a possible PDCCH transmission. Accordingly, in instances in which the search space is ill-defined, the mobile terminal may be subjected to inefficient interference suppression.

BRIEF SUMMARY

A method, apparatus and computer program product are provided in accordance with an example embodiment in order to associate one or more DM-RS ports with a subset of REs that have similar interference characteristics. As such, the interference experienced at the one or more DM-RS ports that are utilized for channel estimation will be approximately the same as that experienced by the other REs that contain data and/or control information. As such, the method, apparatus and computer program product of an example embodiment provide for enhanced interference suppression. The method, apparatus and computer program product of another example embodiment of the present invention provides for defining the search space so as to enable efficient interference suppression by a mobile terminal or other receiving device.

In one embodiment, a method is provided that includes allocating a first subset of resource elements (REs) of a physical resource block (PRB) to a mobile terminal and associating one or more first demodulation reference symbols (DM-RS) ports therewith. The first subset of REs and the first one or more DM-RS ports have common interference characteristics. The method of this embodiment also includes causing transmission of the PRB for reception by the mobile terminal.

In another embodiment, an apparatus is provided that includes at least one processor and at least one memory including computer program code with the at least one memory and the computer program code configured to, with the processor, cause the apparatus to at least allocate a first subset of resource elements (REs) of a physical resource block (PRB) to a mobile terminal and associate one or more first demodulation reference symbols (DM-RS) ports therewith. The first subset of REs and the one or more first DM-RS ports have common interference characteristics. The at least one memory and the computer program code are also configured to, with the processor, cause the apparatus of this embodiment to cause transmission of the PRB for reception by the mobile terminal.

In a further embodiment, an apparatus is provided that includes means for allocating a first subset of resource elements (REs) of a physical resource block (PRB) to a mobile terminal and associating one or more first demodulation reference symbols (DM-RS) ports therewith. The first subset of REs and the one or more first DM-RS ports have common interference characteristics. The apparatus of this embodiment also includes means for causing transmission of the PRB for reception by the mobile terminal.

In yet another embodiment, a computer program product is provided that includes at least one non-transitory computer-readable storage medium having computer-readable program instructions stored therein with the computer-readable program instructions comprising program instructions configured to allocate a first subset of resource elements (REs) of a physical resource block (PRB) to a mobile terminal and associate one or more first demodulation reference symbols (DM-RS) ports therewith. The first subset of REs and the one or more first DM-RS ports have common interference characteristics. The computer-readable program instructions of this embodiment also include program instructions configured to cause transmission of the PRB for reception by the mobile terminal.

In one embodiment, a method is provided that includes receiving a physical resource block (PRB) in which a first subset of resource elements (REs) has been allocated to a mobile terminal and one or more first demodulation reference symbols (DM-RS) ports are associated with the first subset of REs. The first subset of REs and the one or more first DM-RS ports have common interference characteristics. The method of this embodiment also includes decoding the first subset of REs based at least partially upon the one or more first DM-RS ports.

In another embodiment, an apparatus is provided that includes at least one processor and at least one memory including computer program code with the at least one memory and the computer program code configured to, with the processor, cause the apparatus to receive a physical resource block (PRB) in which a first subset of resource elements (REs) has been allocated to a mobile terminal and one or more first demodulation reference symbols (DM-RS) ports are associated with the first subset of REs. The first subset of REs and the one or more first DM-RS ports have common interference characteristics. The at least one memory and the computer program code are also configured to, with the processor, cause the apparatus of this embodiment to decode the first subset of REs based at least partially upon the one or more first DM-RS ports.

In a further embodiment, an apparatus is provided that includes means for receiving a physical resource block (PRB) in which a first subset of resource elements (REs) has been allocated to a mobile terminal and one or more first demodulation reference symbols (DM-RS) ports are associated with the first subset of REs. The first subset of REs and the one or more first DM-RS ports have common interference characteristics. The apparatus of this embodiment also includes means for decoding the first subset of REs based at least partially upon the one or more first DM-RS ports.

In yet another embodiment, a computer program product is provided that includes at least one non-transitory computer-readable storage medium having computer-readable program instructions stored therein with the computer-readable program instructions comprising program instructions configured to receive a physical resource block (PRB) in which a first subset of resource elements (REs) has been allocated to a mobile terminal and one or more first demodulation reference symbols (DM-RS) ports are associated with the first subset of REs. The first subset of REs and the one or more first DM-RS ports have common interference characteristics. The computer-readable program instructions of this embodiment also include program instructions configured to decode the first subset of REs based at least partially upon the one or more first DM-RS ports.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Figure 3:
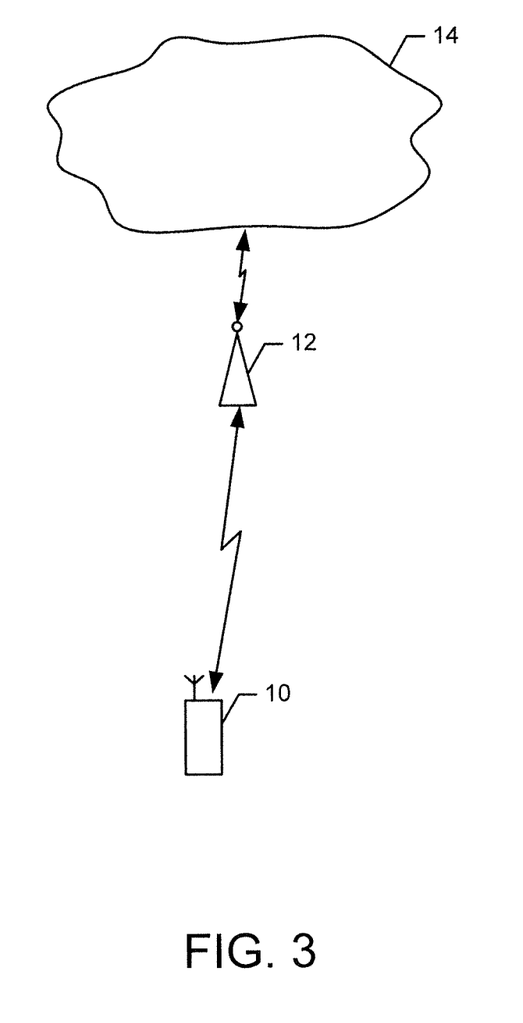
FIG. 3 illustrates a system in which interference may be suppressed in accordance with an example embodiment of the present invention.

In accordance with an example embodiment of the present invention, a technique for providing enhanced interference suppression is provided. Referring now to FIG. 3, a system that supports communications between a mobile terminal 10 and a network 14, such as an Long Term Evolution (LTE) network, a Long Term Evolution-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network, via a base station 12 is shown. Various types of mobile teilninals may be employed including, for example, a mobile communication device such as, for example, a mobile telephone, portable digital assistant (PDA), pager, laptop computer, tablet computer or any of numerous other hand held or portable communication devices, computation devices, content generation devices, content consumption devices, combinations thereof or any other type of user equipment. Regardless of the type of mobile terminal, the mobile terminal may communicate with the network via a base station, such as a Node B, an evolved Node B (eNB), an access point, a relay node or the like. The communications between the mobile terminal 10 and the base station 12 may include transmissions via an uplink and a downlink that are established between the mobile terminal and the base station. By providing for improved interference suppression, the communications between the mobile terminal 10 and the base station 12 may be improved.

Figure 4:
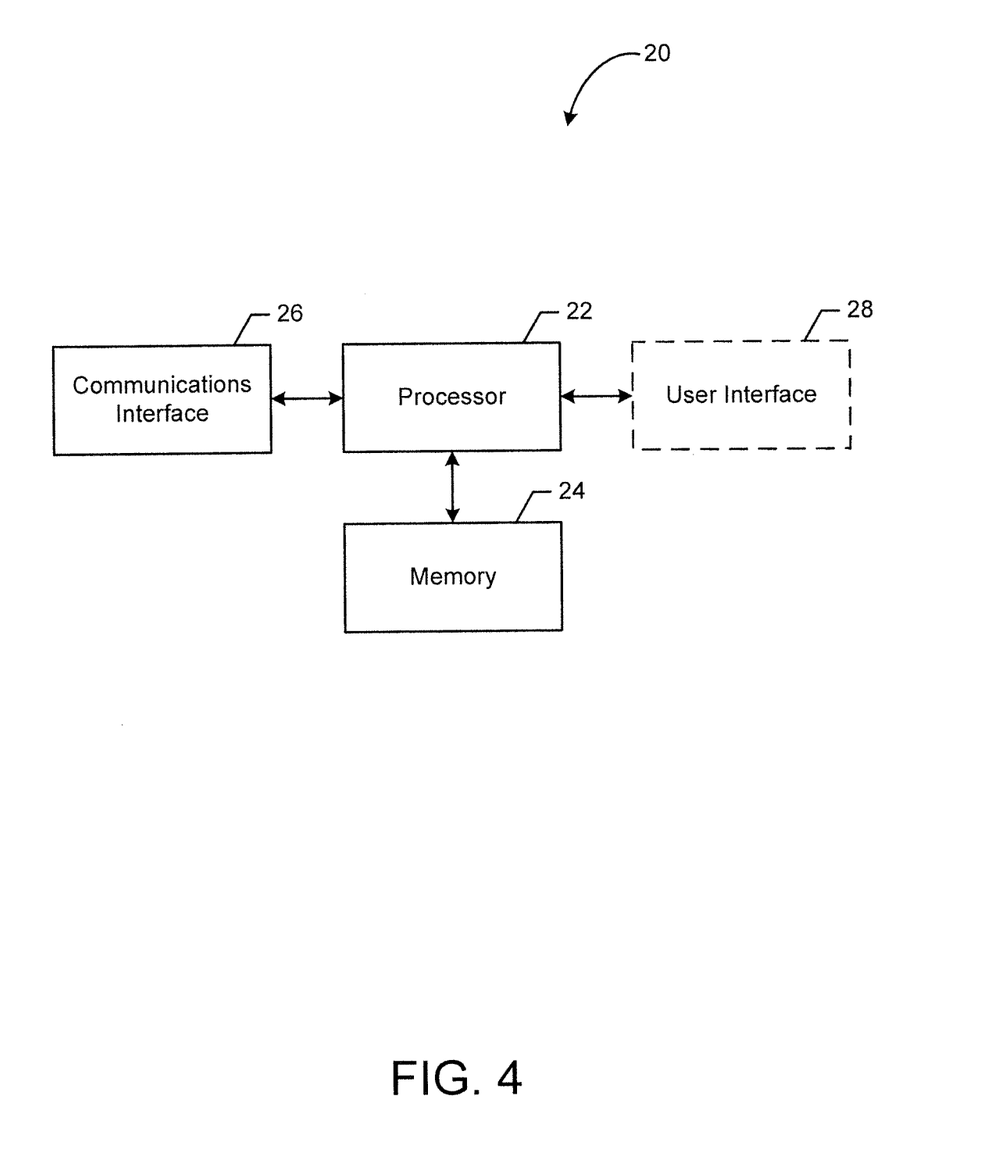
FIG. 4 is a block diagram of an apparatus that may be specifically configured to perform the operations of an example embodiment of the present invention.

The mobile terminal 10 and the base station 12 may implement example embodiments of the method, apparatus and computer program product in order to provide for enhanced interference suppression. In this regard, the mobile terminal 10 and a network entity, such as the base station 12, may each embody or otherwise be associated with an apparatus 20 that is generally depicted in FIG. 4 and that may be configured in accordance with an example embodiment of the present invention as described below, such as in conjunction with FIG. 5 from the perspective of the base station and FIG. 8 from the perspective of the mobile terminal. However, it should be noted that the components, devices or elements described below may not be mandatory and thus some may be omitted in certain embodiments. Additionally, some embodiments may include further or different components, devices or elements beyond those shown and described herein.

As shown in FIG. 4, the apparatus 20 may include or otherwise be in communication with a processing system including, for example, processing circuitry that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 22 and memory 24 that may be in communication with or otherwise control a communication interface 26 and, in some cases in which the apparatus is embodied by the mobile terminal 10, a user interface 28. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal or the base station 12, the processing circuitry may be embodied as a portion of mobile terminal or the access point.

The user interface 28 (if implemented in embodiments of the apparatus 20 embodied by the mobile terminal 10) may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. In one embodiment, the user interface includes user interface circuitry configured to facilitate at least some functions of the user equipment by receiving user input and providing output.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry, such as between the mobile terminal 10 and the base station 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 24 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 22. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 22 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 24 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 5:
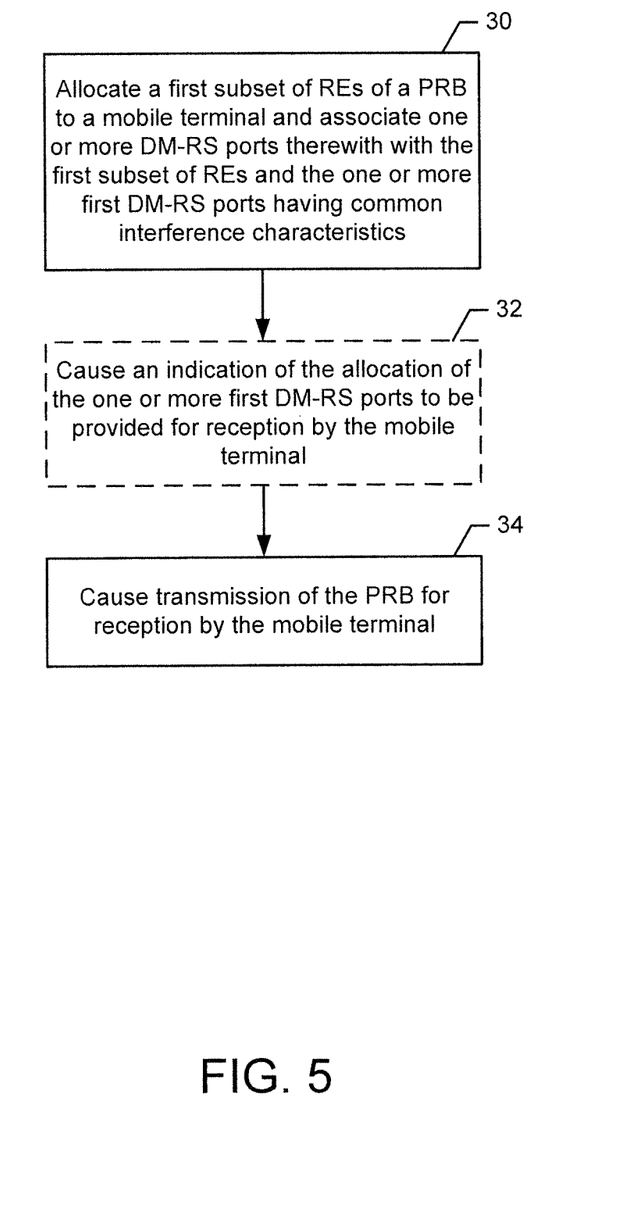
FIG. 5 is a flow chart illustrating the operations performed from the perspective of a network entity, such as a base station, in accordance with an example embodiment of the present invention.
Figure 8:
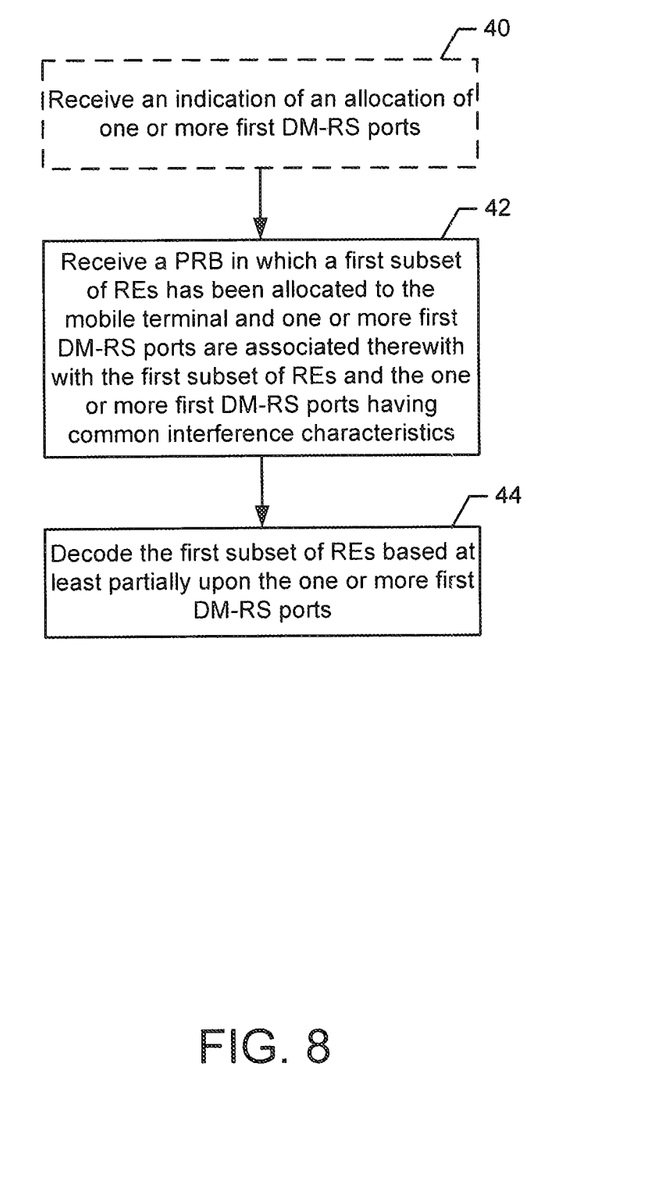
FIG. 8 is a flow chart illustrating the operations performed from the perspective of a mobile terminal in accordance with an example embodiment of the present invention.

FIGS. 5 and 8 are flowcharts illustrating the operations performed by a method, apparatus and computer program product, such as apparatus 20 of FIG. 4, from the perspective of the mobile terminal 10 and a network entity, such as a base station 12, respectively, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a non-transitory memory 24 of an apparatus employing an embodiment of the present invention and executed by a processor 22 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 5 and 8, when executed, convert a computer or processing circuitry into a particular machine configured to perform an example embodiment of the present invention. Accordingly, the operations of FIGS. 5 and 8 define an algorithm for configuring a computer or processing circuitry, e.g., processor, to perform an example embodiment. In some cases, a general purpose computer may be provided with an instance of the processor which performs the algorithm of FIGS. 5 and 8 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. It should be appreciated that each of the modifications, optional additions or amplifications below may be included with the operations above either alone or in combination with any others among the features described herein. In this regard, FIGS. 5 and 8 include operations set forth in dashed boxes, indicative of the optional nature of those operations.

Referring now to FIG. 5, the operations performed by a method, apparatus and computer program product of an example embodiment are illustrated from the perspective of an apparatus 20 that may be embodied by or otherwise associated with a network entity, such as the base station 12. In order to provide for enhanced interference suppression, the apparatus 20 embodied or otherwise associated with a network entity, such as the base station, may include means, such as the processor 22 or the like, for allocating a first subset of REs of a PRB to a mobile terminal 10 and for associating one or more DM-RS ports therewith, thereby effectively splitting the PRB. See operation 30. In accordance with an example embodiment of the present invention, the first subset of REs and the one or more first DM-RS ports have common, that is, the same or similar, interference characteristics. In this regard, the first subset of REs and the one or more first DM-RS ports may have common interference characteristics in instances in which the interference for the first subset of REs and the one or more first DM-RS ports originated from the same source, even if there is still some variation in the noise, etc. between the REs. By allocating the first subset of REs and the one or more first DM-RS ports so as to have the same or similar interference characteristics, interference suppression may be enhanced since the interference covariance matrix that is estimated based upon the interference experienced by the one or more DM-RS ports will more accurately reflect the interference experienced by the first subset of REs. In one embodiment, the relationship between the subset of REs, such as E-PDCCH resources, and the one or more DM-RS ports may apply only for a subset of the aggregation levels with the REs, e.g., E-PDCCH resources, and the one or more DM-RS ports may be freely assigned for the other aggregation levels.

Once the first set of REs and the one or more first DM-RS ports have been allocated, the apparatus 20 embodied or otherwise associated with the base station 12 may include means, such as the processor 22 or the like, for mapping control signals, data or other information, such as E-PDCCH control signals and/or data, to the REs. The apparatus may also include means, such as the processor, the communications interface 26 or the like, for causing transmission of the PRB for reception by the mobile terminal 10. See operation 34 of FIG. 5. The apparatus embodied or otherwise associated with the base station may also optionally include means, such as the processor, the communications interface or the like, for causing an indication of the allocation of the one or more first DM-RS ports to be transmitted for reception by the mobile terminal prior to the transmission of the PRB. See operation 32 of FIG. 5. By transmitting the allocation of the one or more first DM-RS ports to the mobile terminal in advance of the transmission of the PRB, the mobile terminal may more efficiently decode the PRB, such as by demodulating the E-PDCCH and/or PDSCH control signals and/or data, upon its receipt.

Figure 6:
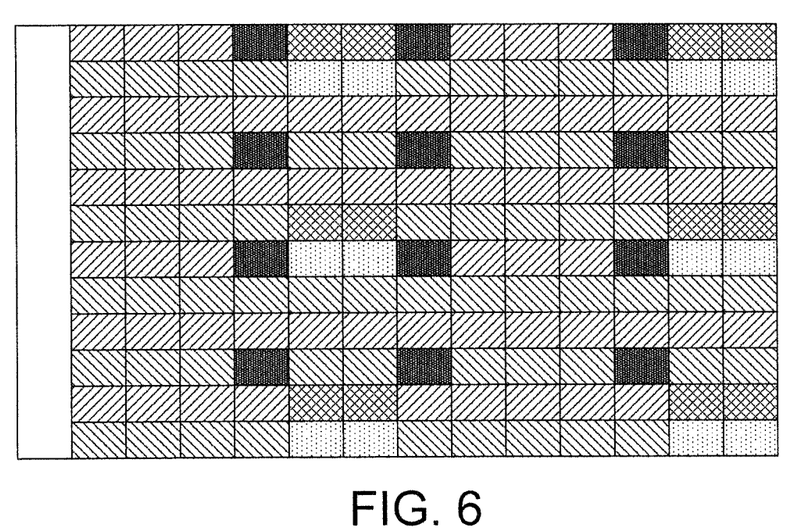
FIG. 6 is an illustration of a PRB configured in accordance with an example embodiment of the present invention.

In one embodiment, the apparatus 20 embodied or otherwise associated with the base station 12 may also include means, such as the processor 22 or the like, for identifying a second subset of REs of the PRB and associating one or more second DM-RS ports therewith. In one embodiment, the PRB may include a first control channel element ($CCE_1$) that includes the first subset of REs and a second channel control element ($CCE_2$) that includes the second subset of REs. The CCEs may be either distributed between multiple PRBs or localized in a single PRB. By way of example, FIG. 6 illustrates one example of a PRB that includes first and second CCEs. In the embodiment of FIG. 6, the first and second CCEs including the first and second subsets of REs, respectively, are interlaced in frequency. As also depicted in FIG. 6, the one or more first DM-RS ports associated with the first subset of REs and one or more the second DM-RS ports associated with the second subset of REs are also interlaced in frequency. As a result of the construction of the PRB, the one or more first DM-RS ports do not overlap with the one or more second DM-RS ports and the first subset of REs do not overlap with the second subset of REs so as to provide for accurate interference covariance estimation.

Figure 7:
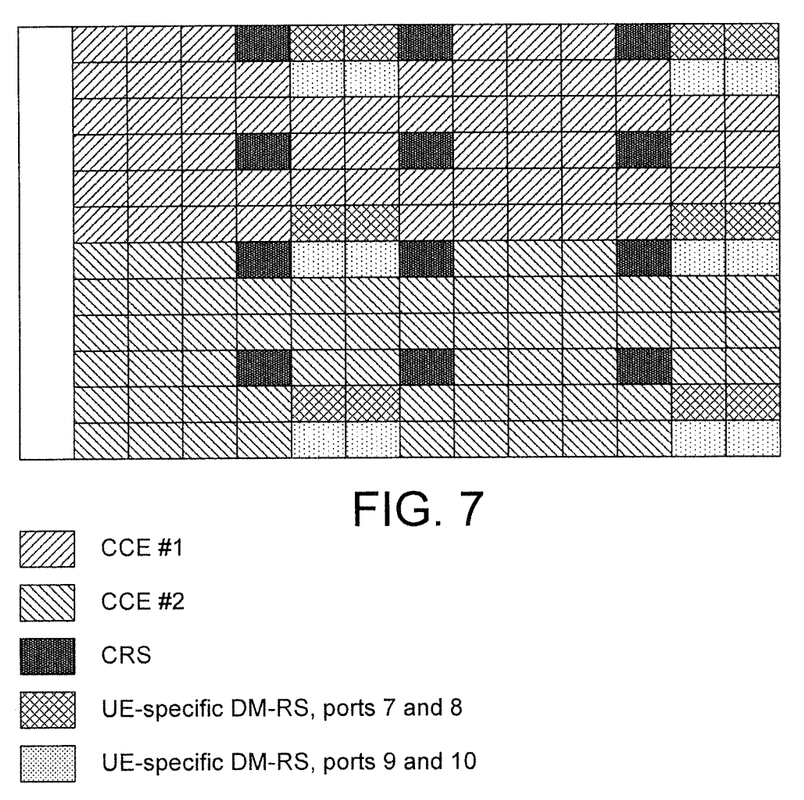
FIG. 7 is an illustration of a PRB configured in accordance with another example embodiment of the present invention.

As another example, FIG. 7 illustrates a PRB in which the first part, that is, the first half of the PRB, contain the first CCE and the second part, that is, the second half, of the PRB includes the second CCE. The first subset of REs is included in the first CCE and the second subset of REs is included in the second CCE. The first and second REs do not overlap with one another. Similarly, the first DM-RS ports and second DM-RS ports associated with the first and second subset of REs do not overlap with one another, thereby insuring proper interference covariance estimation for interference suppression purposes.

In regards to the allocation of the first subset of REs and the one or more first DM-RS ports, the apparatus 20, such as the processor 22, may be configured to allocate the first subset of REs and the one or more first DM-RS ports such that, in an instance in which the one or more first DM-RS ports overlap the one or more second DM-RS ports, the associated first subset of REs also overlaps the second subset of REs. Similarly, in an instance in which the one or more first DM-RS ports are non-overlapping relative to the one or more second DM-RS ports, the apparatus, such as the processor, may be configured to allocate the first subset of REs so as to also be non-overlapping relative to the second subset of REs. In one embodiment, the apparatus, such as the processor, may allocate the first subset of REs and the one or more first DM-RS ports in such a manner as to have common interference characteristics by providing for both multiplexing of the first subset of REs with the second subset of REs and multiplexing of the one or more first DM-RS ports with one or more DM-RS ports in accordance with FDM or TDM, or in accordance with SDM or CDM. For example, the first subset of REs may be multiplexed with the second subset of REs in accordance with either FDM or TDM and the one or more first DM-RS ports may be multiplexed with the one or more second DM-RS ports in accordance with either FDM or TDM, e.g., the first set of REs may be multiplexed with the second subset of REs in accordance with FDM and the one or more first DM-RS ports may be multiplexed with the one or more second DM-RS ports in accordance with TDM. As another example, the first subset of REs may be multiplexed with the second subset of REs in accordance with either SDM or CDM and the one or more first DM-RS ports may be multiplexed with the one or more second DM-RS ports in accordance with either SDM or CDM, e.g., the first subset of REs may be multiplexed with the second subset of REs in accordance with SDM and the one or more first DM-RS ports may be multiplexed with the one or more second DM-RS ports in accordance with CDM.

Although described above in conjunction with the subsets of REs carrying control signals, such as a result of having mapped a control channel, such as the E-PDCCH, to the subsets of REs, other types of channels, such as data channels, e.g., the physical downlink shared channel (PDSCH), may be mapped to one or more of the subsets of REs such that one or more of the subsets of REs carry data or other types of signals. As such, the subsets of REs may carry.control or data signals independently of one another. For example, the first and second subsets of REs may both carry control signals, may both carry data or one may carry control signals and the other may carry data. In this regard, the PRB may include a first data channel, e.g., a first instance of PDSCH, that includes the first subset of REs and a second data channel, e.g., a second instance of PDSCH, that includes the second subset of REs. Regardless of the type of channel mapped to the subset of REs, the other aspects of the method, apparatus and computer program product of the example embodiment described above including, for example, those related to the DM-RS ports and the common interference characteristics may remain the same.

Referring now to FIG. 8, the operations performed by an apparatus 20 embodied by or otherwise associated with a mobile teiniinal 10 are illustrated. As shown in operation 42 of FIG. 8, the apparatus embodied or otherwise associated with a mobile terminal may include means, such as a processor 22, the communications interface 26 or the like, for receiving a PRB including, for example, E-PDCCH and/or PDSCH control signals and/or data in which the first set of REs has been allocated to the mobile terminal and one or more first DM-RS ports are associated with the first subset of REs. As discussed above, the first subset of REs and the one or more first DM-RS ports have common, that is, the same or similar, interference characteristics in that the interference originates from the same source(s). In this regard, in an instance in which the one or more first DM-RS ports overlap with the one or more second DM-RS ports, the associated first subset of REs may also overlap with the second subset of REs. Similarly, in an instance in which the one or more first DM-RS ports do not overlap with the one or more second DM-RS ports, the associated first subset of REs also does not overlap with the second subset of REs. In one embodiment, the first subset of REs may be multiplexed with the second subset of REs and the one or more first DM-RS ports may also be multiplexed with the one or more second DM-RS ports, utilizing either FDM or TDM, or by utilizing SDM or CDM.

As illustrated in operation 44 of FIG. 8, the apparatus 20 embodied or otherwise associated with a mobile terminal 10 may also include means, such as the processor 22 or the like, for decoding the first subset of REs, such as by demodulating the E-PDCCH and/or PDSCH control signals and/or data, based at least partially upon the one or more first DM-RS ports. In this regard, the apparatus, such as the processor, may be configured to blindly decode the first subset of REs based at least in part upon the one or more first DM-RS ports. By way of example, the apparatus, such as the processor, may endeavor to detect the DCI format by attempting to blindly decode the first subset of REs using the one or more first DM-RS ports and assumptions regarding the resource allocation, aggregation level and DCI format size, and then checking the cyclic redundancy check (CRC) scrambled with the radio network temporary identifier (RNTI) to determine if the first subset of REs has been properly decoded. Once the apparatus, such as the processor, determines that the CRC check is satisfied, the apparatus considers the first subset of REs to be properly decoded and considers the assumptions made with respect to resource allocation, e.g., RE mapping, aggregation level, DCI format size and DM-RS port(s) to be correct. In this regard, the apparatus, such as the processor, may determine the interference covariance matrix to be utilized for data detection, such as during LMMSE-IRC processing, from the one or more first DM-RS ports associated with the search space after subtracting its own signal contribution, that is, the signal estimate corresponding to the allocated DM-RS port(s). In one embodiment, the apparatus embodied or otherwise associated with a mobile terminal may also optionally include means, such as the processor, the communications interface 26 or the like, for receiving an indication of the allocation of the one or more first DM-RS ports prior to receiving the PRB. See operation 40 of FIG. 8. Thus, the apparatus of this embodiment may more efficiently decode the first subset of REs based upon the indication of the allocation of the one or more first DM-RS ports that is received in advance.

As described above in conjunction with the operation of an apparatus 20 embodied or otherwise associated with a base station 12 and as shown in FIGS. 6 and 7, an apparatus embodied or otherwise associated with the mobile terminal 10 may also include means, such as the processor 22, the communications interface 26 or the like, for receiving the PRB which includes first and second CCEs. In one embodiment, the first CCE includes the first subset of REs and the second CCE includes a second subset of REs. See, for example, FIG. 6. As shown in FIG. 7, however, the first and second subsets of REs may each be included within a plurality of CCEs, although the first and second subsets of REs and the first and second DM-RS ports may not necessarily overlap in this embodiment either.

As described above, although generally described in conjunction with the subsets of REs carrying control signals, such as a result of having mapped a control channel, such as the E-PDCCH, to the subsets of REs, other types of channels, such as data channels, e.g., the PDSCH, may be mapped to one or more of the subsets of REs such that one or more of the subsets of REs carry data or other types of signals. As also noted above, regardless of the type of channel mapped to the subset of REs, the other aspects of the method, apparatus and computer program product of the example embodiment described above including, for example, those related to the DM-RS ports and the common interference characteristics may remain the same.

By associating one or more DM-RS ports with a subset of REs that have the same or similar interference characteristics, the interference experience of the one or more DM-RS ports will be more closely representative of the interference experience of the subset of REs. As such, the interference covariance matrix that is estimated based upon the one or more DM-RS ports will also more accurately reflect interference experience of the subset of REs. As such, the method, apparatus and computer program product of an example embodiment provide for enhanced interference suppression, thereby resulting in improved throughput performance, such as in situations with substantial inter-cell interference. Moreover, the method, apparatus and computer program product of one example embodiment may enable interference suppression in an efficient manner by better defining the search space.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   allocating a first subset of resource elements (REs) of a physical resource block (PRB) to a mobile terminal and associating one or more first demodulation reference symbols (DM-RS) ports therewith, wherein the first subset of REs and the one or more first DM-RS ports have common interference characteristics, wherein in an instance in which the one or more first DM-RS ports are non-overlapping with respect to one or more second DM-RS ports associated with a second subset of REs of the PRB, the associated first subset of REs also are non-overlapping with respect to the second subset of REs;
   multiplexing the first subset of REs with the second subset of REs in accordance with frequency division multiplexing (FDM), time division multiplexing (TDM), code division multiplexing (CDM) or space division multiplexing (SDM) and multiplexing the one or more first DM-RS ports with the one or more second DM-RS ports in accordance with FDM, TDM, CDM or SDM; and
   causing transmission of the PRB for reception by the mobile terminal.

2. A method according to claim 1 further comprising identifying the second subset of REs of the PRB and associating one or more second DM-RS ports therewith.

3. A method according to claim 2 wherein in an instance in which the one or more first DM-RS ports overlap with the one or more second DM-RS ports, the associated first subset of REs also overlaps with the second subset of REs.

4. A method according to claim 1 wherein the first subset of REs is mapped to either a control channel or a data channel so as to carry control signals or data, respectively.

5. A method according to claim 1 further comprising causing an indication of the allocation of the one or more first DM-RS ports to be transmitted for reception by the mobile terminal.

6. An apparatus comprising at least one processor and at least one memory including computer program code, the at least one memory and the computer program code configured to, with the processor, cause the apparatus to at least:
   allocate a first subset of resource elements (REs) of a physical resource block (PRB) to a mobile terminal and associate one or more first demodulation reference symbols (DM-RS) ports therewith, wherein the first subset of REs and the one or more first DM-RS ports have common interference characteristics, wherein in an instance in which the one or more first DM-RS ports are non-overlapping with respect to one or more second DM-RS ports associated with a second subset of REs of the PRB, the associated first subset of REs also are non-overlapping with respect to the second subset of REs;
   multiplexing the first subset of REs with the second subset of REs in accordance with frequency division multiplexing (FDM), time division multiplexing (TDM), code division multiplexing (CDM) or space division multiplexing (SDM) and multiplexing the one or more first DM-RS ports with the one or more second DM-RS ports in accordance with FDM, TDM, CDM or SDM; and
   cause transmission of the PRB for reception by the mobile terminal.

7. An apparatus according to claim 6 wherein the at least one memory and the computer program code are further configured to, with the processor, cause the apparatus to identify the second subset of REs of the PRB and associate one or more second DM-RS ports therewith.

8. An apparatus according to claim 7 wherein in an instance in which the one or more first DM-RS ports overlap with the one or more second DM-RS ports, the associated first subset of REs also overlaps with the second subset of REs.

9. A method comprising:
   receiving a physical resource block (PRB) in which first and second subsets of resource elements (REs) have been allocated to a mobile terminal and one or more first and second demodulation reference symbols (DM-RS) ports are associated with the first and second subsets, respectively, of REs, wherein the first subset of REs and the one or more first DM-RS ports have common interference characteristics, wherein in an instance in which the one or more first DM-RS ports are non-overlapping with the one or more second DM-RS ports, the associated first subset of REs also are non-overlapping with the second subset of REs;
   demultiplexing the first subset of REs with the second subset of REs in accordance with frequency division multiplexing (FDM), time division multiplexing (TDM), code division multiplexing (CDM) or space division multiplexing (SDM) and demultiplexing the one or more first DM-RS ports and the one or more second DM-RS ports utilizing FDM, TDM, CDM or SDM; and
   decoding the first subset of REs based at least partially upon the one or more first DM-RS ports.

10. A method according to claim 9 wherein the first subset of REs is mapped to either a control channel or a data channel so as to carry control signals or data, respectively.

11. A method according to claim 9 further comprising receiving an indication of the allocation of the one or more first DM-RS ports prior to receiving the PRB.

12. A method according to claim 9 wherein in an instance in which the one or more first DM-RS ports overlap with the one or more second DM-RS ports, the associated first subset of REs also overlaps with the second subset of REs.

13. An apparatus comprising at least one processor and at least one memory including computer program code, the at least one memory and the computer program code configured to, with the processor, cause the apparatus to at least:
   receive a physical resource block (PRB) in which first and second subsets of resource elements (REs) have been allocated to a mobile terminal and one or more first demodulation reference symbols (DM-RS) ports are associated with the first and second subsets, respectively, of REs, wherein the first subset of REs and the one or more first DM-RS ports have common interference characteristics, wherein in an instance in which the one or more first DM-RS ports are non-overlapping with the one or more second DM-RS ports, the associated first subset of REs also are non-overlapping with the second subset of REs;

demultiplexing the first subset of REs with the second subset of REs in accordance with frequency division multiplexing (FDM), time division multiplexing (TDM), code division multiplexing (CDM) or space division multiplexing (SDM) and demultiplexing the one or more first DM-RS ports and the one or more second DM-RS ports utilizing FDM, TDM, CDM or SDM; and decode the first subset of REs based at least partially upon the one or more first DM-RS ports.

14. An apparatus according to claim 13 wherein the first subset of REs is mapped to either a control channel or a data channel so as to carry control signals or data, respectively.

15. An apparatus according to claim 13 wherein the at least one memory and the computer program code are further configured to, with the processor, cause the apparatus to receive an indication of the allocation of the one or more first DM-RS ports prior to receiving the PRB.

* * * * *